(12) United States Patent
Li et al.

(10) Patent No.: US 11,489,394 B2
(45) Date of Patent: Nov. 1, 2022

(54) SLOT WEDGE ELEMENT, STATOR DEVICE, MOTOR, AND WIND TURBINE

(71) Applicant: XINJIANG GOLDWIND SCIENCE & TECHNOLOGY CO., LTD., Urumqi (CN)

(72) Inventors: Jinhui Li, Beijing (CN); Wenshou Fan, Beijing (CN); Dinghui Wang, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 224 days.

(21) Appl. No.: 16/766,574

(22) PCT Filed: Apr. 15, 2019

(86) PCT No.: PCT/CN2019/082624
§ 371 (c)(1),
(2) Date: May 22, 2020

(87) PCT Pub. No.: WO2020/042625
PCT Pub. Date: Mar. 5, 2020

(65) Prior Publication Data
US 2021/0006117 A1  Jan. 7, 2021

(30) Foreign Application Priority Data
Aug. 30, 2018  (CN) .......................... 201811002517.9

(51) Int. Cl.
*H02K 3/24* (2006.01)
*H02K 3/487* (2006.01)
(Continued)

(52) U.S. Cl.
CPC ............. *H02K 3/487* (2013.01); *F03D 80/60* (2016.05); *H02K 3/24* (2013.01); *H02K 7/183* (2013.01); *F05B 2260/20* (2013.01)

(58) Field of Classification Search
CPC .. F03D 80/60; F03D 9/25; H02K 3/24; H02K 7/183; H02K 3/487; H02K 3/12;
(Continued)

(56) References Cited

U.S. PATENT DOCUMENTS 3,139,550 A * 6/1964 Geer ...................... H02K 3/487
310/214
4,184,091 A * 1/1980 Khutoretsky .......... H02K 3/487
310/214
(Continued)

FOREIGN PATENT DOCUMENTS

CN  201319552 Y  9/2009
CN  202334060 U  7/2012
(Continued)

OTHER PUBLICATIONS

International Search Report and Written Opinion in corresponding PCT Application No. PCT/CN2019/082624, dated Jun. 13, 2019, 10 pages.
(Continued)

*Primary Examiner* — Leda T Pham
(74) *Attorney, Agent, or Firm* — Bayes PLLC

(57) ABSTRACT

The present application relates to a slot wedge element, a stator device, a motor, and a wind turbine. The slot wedge element extends in a first direction and has opposite first and second edges has a first surface and a second surface in the thickness direction thereof, and is attached to a winding of the stator device via the first surface. The second surface includes a first portion, a second portion, and a third portion sequentially distributed in the first direction. A second (Continued)

thickness between the second portion and the first surface is greater than a first thickness between the first portion and the first surface, and the second thickness is greater than or equal to a third thickness between the third portion and the first surface. The first thickness is decreasingly distributed in a direction from the second portion to the first edge.

20 Claims, 8 Drawing Sheets

(51) Int. Cl.
*F03D 80/60* (2016.01)
*H02K 7/18* (2006.01)

(58) Field of Classification Search
CPC .......... H02K 15/12; H02K 1/12; H02K 3/493; H02K 15/024; H02K 15/085; H02K 15/068
See application file for complete search history.

(56) References Cited

U.S. PATENT DOCUMENTS

| | | | | |
|---|---|---|---|---|
| 4,387,316 | A * | 6/1983 | Katsekas | H02K 3/487 174/DIG. 20 |
| 4,633,574 | A | 1/1987 | Bath et al. | |
| 6,294,855 | B1 * | 9/2001 | Kelleher | H02K 3/487 336/197 |

FOREIGN PATENT DOCUMENTS

| | | |
|---|---|---|
| CN | 102725945 A | 10/2012 |
| CN | 102738940 A | 10/2012 |
| CN | 202679108 U | 1/2013 |
| CN | 103368291 A | 10/2013 |
| CN | 204669165 U | 9/2015 |
| CN | 206992834 U | 2/2018 |
| CN | 107979203 A | 5/2018 |
| CN | 109149828 A | 1/2019 |
| EP | 1416609 A2 | 5/2004 |
| JP | S5432706 A | 3/1979 |
| JP | S5875451 U | 5/1983 |
| JP | S6051427 A | 3/1985 |
| WO | 2018134044 A1 | 7/2018 |

OTHER PUBLICATIONS

First Office action issued in corresponding Chinese Application No. 201811002517.9, dated Jun. 3, 2019, 6 pages.
Second Office Action in corresponding Chinese Application No. 201811002517.9 dated Dec. 11, 2019 (6 pages).
First Office Action in corresponding Australian Application No. 2019327891 dated Apr. 14, 2021 (4 pages).
First Office Action in Indian Application No. 202017020869 dated Dec. 29, 2020 (5 pages).
Extended European Search Report in corresponding European Application No. 19855505.4 dated Mar. 22, 2021 (12 pages).

* cited by examiner

US 11,489,394 B2

SLOT WEDGE ELEMENT, STATOR DEVICE, MOTOR, AND WIND TURBINE

CROSS REFERENCE TO RELATED APPLICATIONS

This application is the National Phase of International Application No. PCT/CN2019/082624, filed on Apr. 15, 2019, which claims priority to Chinese Patent Application No. 201811002517.9, filed on Aug. 30, 2018. Each of the above-identified applications is hereby incorporated by reference in entirety.

TECHNICAL FIELD

The present disclosure relates to a technical field of motors, and particularly relates to a slot wedge element, a stator device, a motor and a wind turbine.

BACKGROUND

In the process of converting mechanical energy into electrical energy or vice versa, there will be certain loss in a motor (a generator or an electric motor), especially the loss caused by stator conductor, including copper loss of windings and iron loss of cores. These losses will convert into heat and raise a temperature of the motor. Because of its large heat dissipation area and good cooling effect, a radial ventilation cooling mode has gradually become one of the common cooling modes for the motor, especially in big-size wind turbine.

SUMMARY

One object of the present disclosure is to provide a slot wedge element, a stator device, a motor and a wind turbine, which can make a distribution of a cooling air in radial channels of the stator device to be more uniform in an axial direction, so as to improve a cooling effect on the motor.

On one aspect, the embodiments of the present disclosure provides a slot wedge element for a stator device, wherein the slot wedge element extends in a first direction and includes a first edge and a second edge opposite to each other, and the slot wedge element includes a first surface and a second surface in its thickness direction, and is attached to a winding of the stator device via the first surface; the second surface includes a first portion, a second portion and a third portion which are sequentially and continuously distributed in the first direction, wherein the first portion is connected with the first edge, and the third portion is connected with the second edge; and wherein, a second thickness between the second portion and the first surface is greater than a first thickness between the first portion and the first surface, the second thickness is greater than or equal to a third thickness between the third portion and the first surface, and the first thickness decreases progressively in a direction from the second portion to the first edge.

On a further aspect, the embodiments of the present disclosure provide a stator device, includes: a core, including at least four core members spaced apart in an axial direction of the stator device, each of which is provided with a plurality of slots spaced apart in a circumferential direction, and the plurality of slots of the at least four core members are arranged to correspond one by one in the axial direction; a plurality of windings, each of which is arranged in the slots in the axial direction; and a plurality of slot wedge elements according to any of the above-mentioned embodiments, each of which is arranged in the slots in the axial direction and attached to the winding via the first surface.

On another aspect, the embodiments of the present disclosure provide a motor, which includes a stator device as described above, wherein the stator device is fixed by a stator bracket, and each adjacent wo core members in the stator device define a radial channel; and a rotor device, disposed surrounding the stator device on a peripheral side of the stator device, or the stator device is disposed surrounding the rotor device on a peripheral side of the rotor device, the motor includes chambers on two ends in the axial direction, an air gap is formed between the rotor device and the slot wedge element, and the chambers, the air gap and the radial channels are communicated to define a channel for flow of a cooling medium.

On a further aspect, the embodiments of the present disclosure provide a wind turbine, including a motor as described above.

By providing the slot wedge element in the stator device, the slot wedge element, the stator device, the motor and the wind turbine according to the embodiments of the present disclosure can reduce the local resistance on the flow of the cooling medium at inlets of the air gap in the motor, and make the cooling medium in the radial channels of the stator device to distribute more evenly in the axial direction, thereby improving the cooling effect on the motor and improving the power density of the motor.

BRIEF DESCRIPTION OF THE DRAWINGS

The present disclosure may be understood better in the description of the specific embodiments of the present disclosure by reference to the accompanying drawings as below, wherein.

Other features, objects and advantages of the present disclosure will be more apparent by reading the following detailed description of the non-limitative embodiments by reference to the accompanying drawings, wherein the same or similar reference numerals refer to the same or similar features.

Figure 1:
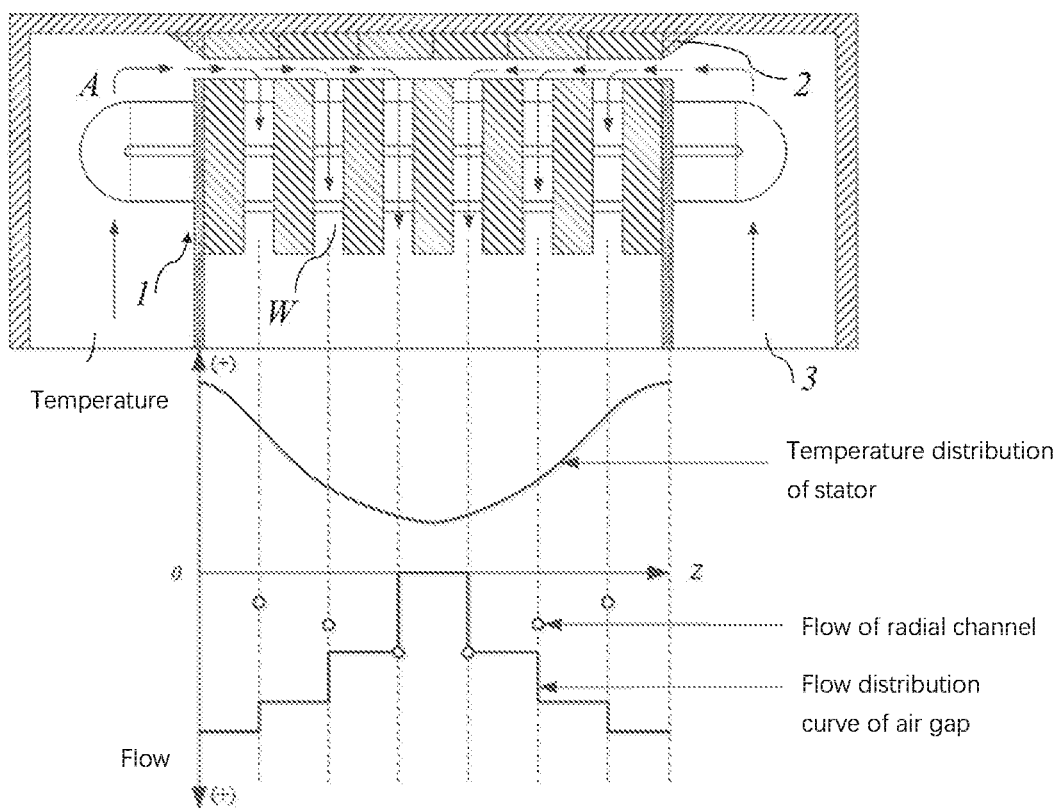
FIG. 1 is a flow distribution schematic diagram of a cooling medium in a motor in the prior art.

Wherein:

1-stator; 2-rotor; A-air gap; W-radial channel; C-chamber; 10-slot wedge element; 11-first surface; 12-second surface; 12a-first portion; 12b-second portion; 12c-third portion; 13-first edge; 14-second edge; X-first direction; 20-core; 21-core member; 22-slot; 23-pad strip; 30-winding; 100-stator device; 200-rotor device.

DETAILED DESCRIPTION

Features of various aspects of and exemplary embodiments of the present disclosure will be described in detail below. In the following detailed description, many specific details are proposed to provide a comprehensive understanding of the present disclosure. However, it will be apparent to the person skilled in the art that the present disclosure can be implemented without requiring some of these specific details. The following description of the embodiments is only intended to provide a better understanding of the present disclosure by showing examples of the present disclosure. The present disclosure is not limited to any specific configurations and algorithms mentioned as below, while covers any modifications, replacements and improvements to the elements, components and algorithms without departing from the inventive concept of the present disclosure. In the accompanying drawings and the following description, the well-known structures and techniques are not illustrated, to avoid unnecessary blur of the present disclosure.

Below, the exemplary embodiments will be described more completely by reference to the accompanying drawings. However, the exemplary embodiments can be implemented in various manners, and the present disclosure cannot be understood as being limited to the described embodiments. In contrary, these embodiments are provided to make the present disclosure more comprehensive and complete, and to fully convey the concept thereof to the person skilled in the art. In the drawings, thickness of regions and layers may be exaggerated for clarity. The same reference numerals in the drawings represent the same or similar structures, and thus the detailed description of the same or similar structures will not be repeated.

In order to better understand the present disclosure, a slot wedge element, a stator device, a motor and a wind turbine according to the embodiments of the present disclosure will be described in detail by reference to FIG. 1-FIG. 13.

Figure 2:
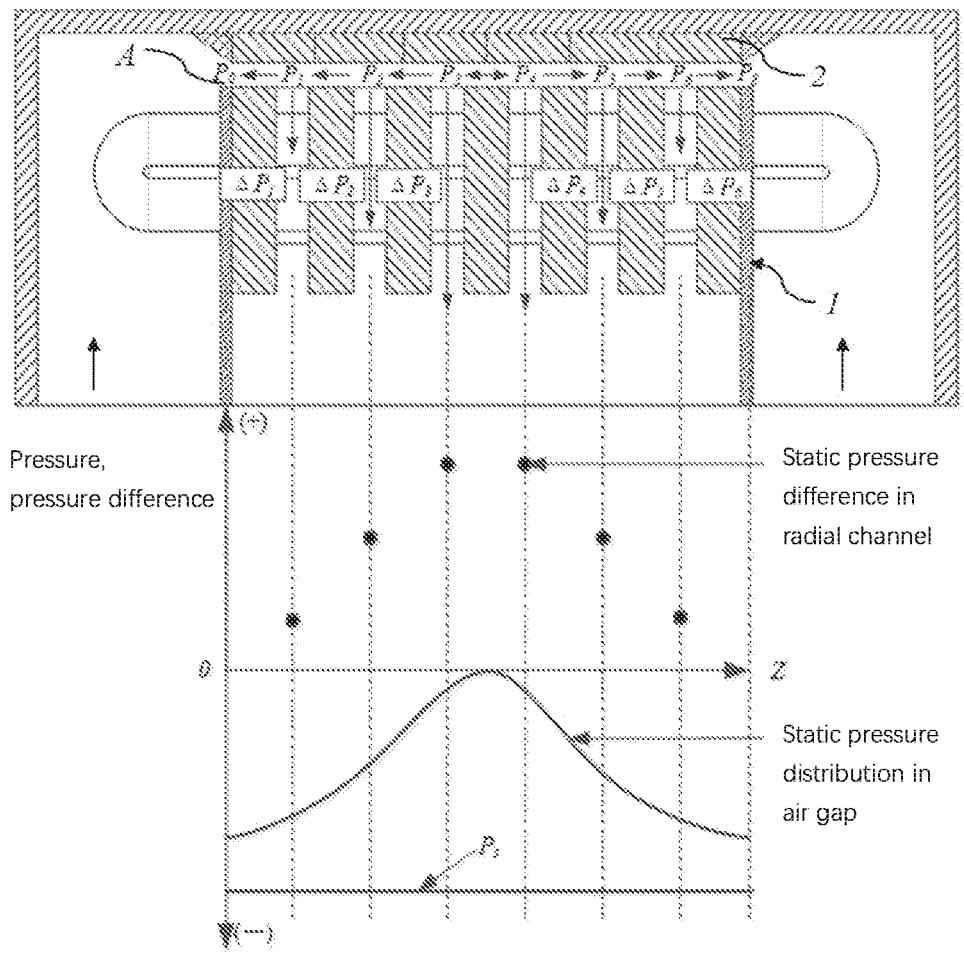
FIG. 2 is a static pressure distribution schematic diagram of a cooling medium in a motor in the prior art.

As shown FIG. 1 and FIG. 2, in the motor of the prior art, especially in a permanent magnet synchronous wind turbine, mostly, the radial ventilation cooling mode is realized by communicating an air gap A formed between a stator 1 and a rotor 2, a plurality of radial channels W in the stator 1 and chambers 3 at both ends of the motor in an axial direction thereof. After a cooling medium flows into the air gap A from the chambers 3 at both ends, it is divided by the plurality of radial channels W and flows out of the stator 1, thereby completing the cooling of the motor.

As shown by a flow distribution curve of the air gap in FIG. 1, the flow of the cooling medium in the air gap A presents a trend of decreasing gradually from two end sides in the axial direction to a middle confluence point due to the dividing of the cooling medium by the radial channels W in the stator 1. As shown by a static pressure distribution curve of the air gap in FIG. 2, a flow velocity of the cooling medium in the air gap A presents a trend of decreasing gradually from the two end sides in the axial direction to the middle confluence point, since generally a cross-sectional area of an axial flow in the air gap A remains constant and axial thicknesses of the radial channels W are the same. According to the principle of aerodynamics, contrary to the change trend of the flow velocity in the axial direction, the static pressure distribution of the cooling medium in the air gap A presents a trend of increasing gradually from the two end sides to the middle confluence point.

As the multiple radial channels W are communicated with the air gap A, inlets of the multiple radial channels W distributed in the axial direction are all located in the air gap A, wherein P1 is a static pressure of a first radial channel on one side in the axial direction, P2 is a static pressure of a second radial channel, P6 is a static pressure of a sixth radial channel on the other side in the axial direction, P5 is a static pressure of a fifth radial channel, and P3 and P4 are a static pressure of a third radial channel and a static pressure of a fourth radial channel at the middle confluence point, respectively. As can be seen from arrows directed in a radial direction in the figure, P1<P2<P3=P4>P5>P6. That is to say, the static pressure levels at the inlets of the multiple radial channels W also present the trend of increasing gradually from the two end sides in the axial direction to the middle confluence point. Since the cooling medium flowing out of the multiple radial channels W presents a basically consistent static pressure level after being fully mixed, static pressure differences in the radial channels W distributed at the middle confluence point in the axial direction are higher (that is, the static pressure differences ΔP3 and ΔP4 in the third and fourth radial channels are higher), while the static pressure differences in the radial channels W closing to the two end sides in the axial direction are lower (that is, the static pressure differences ΔP2, ΔP1 in the second and first radial channels and the static pressure differences ΔP5, ΔP6 in the fifth and sixth radial channels are lower), as shown by the static pressure difference distribution of the respective radial channels indicated by solid dots in FIG. 2.

Since the static pressure difference in the radial channel W is formed by resistance dissipation in the flowing of the cooling medium in the radial channel W, that is to say, the flow velocity of the cooling medium in the radial channel W with a higher static pressure difference, which is located at the middle in the axial direction, is larger, while the flow velocity of the cooling medium in the radial channel W, the static pressure difference of which is lower as being closer to the two end sides in the axial direction, is smaller. Due to the consistent structure of the radial channels W distributed in the axial direction, a flow of the cooling medium in the radial channel W with a larger flow velocity is larger, while the flow of the cooling medium in the radial channel W with a smaller flow velocity is smaller. Since the flow velocity of the cooling medium in the radial channel W with a higher static pressure difference and located at the middle in the axial direction is larger, and the flow velocity of the cooling medium in the radial channel W, the static pressure difference of which is lower as being closer to the two end sides in the axial direction, is smaller, the flows of the cooling medium in the radial channels W present a trend of decreasing gradually from the middle to the two end sides in the axial direction, as shown by the flows of the respective radial channels indicated by the hollow dots in the FIG. 1.

Since the loss of the stator 1 is distributed relatively uniformly, the stator cannot be uniformly cooled in the axial direction due to the nonuniform flow distribution of the cooling medium in the multiple radial channels W in the axial direction, resulting in a large difference of the temperature in the stator in the axial direction. Finally, as shown by a stator temperature distribution curve in FIG. 1, the temperature distribution of the stator, in which the loss distribution is uniform, is uneven in the axial direction, resulting in local overheating and large structural thermal stress of the stator 1.

Figure 3:
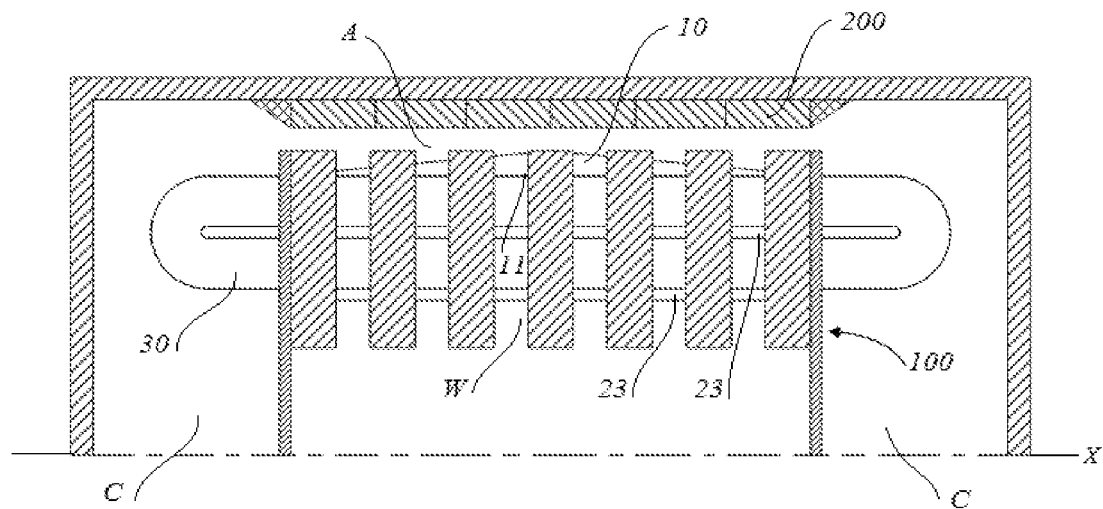
FIG. 3 is a local structural schematic diagram of a motor sectioned in an axial direction provided in the embodiments of the present disclosure.
Figure 4:
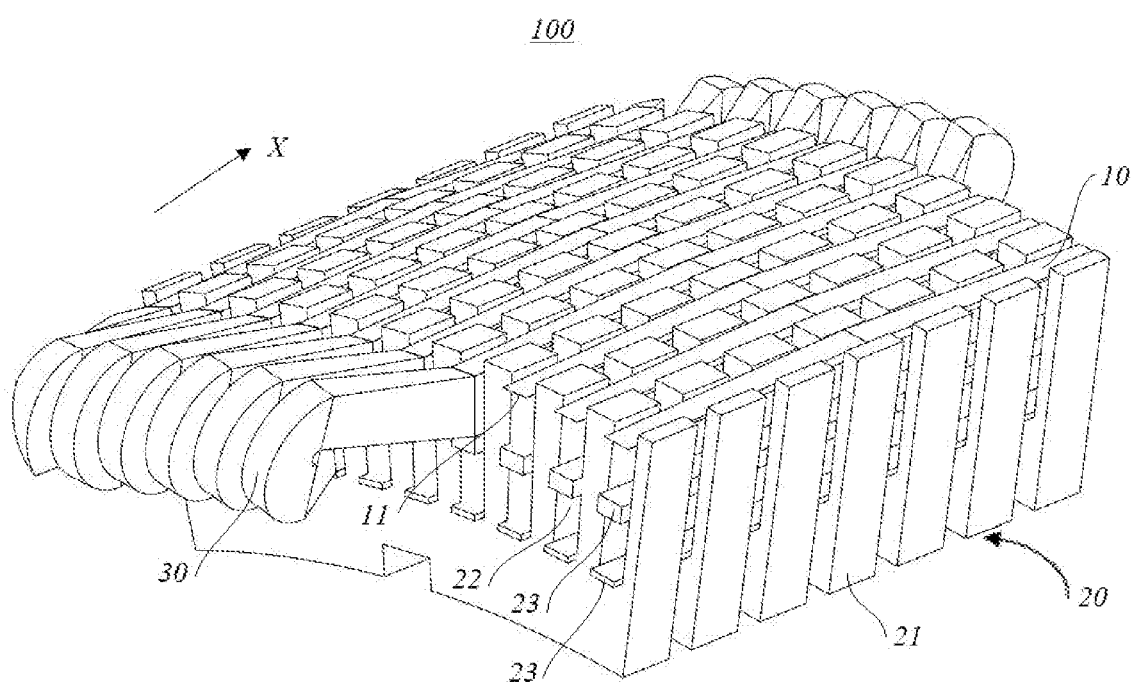
FIG. 4 is a structural schematic diagram of a stator device provided in the embodiments of the present disclosure.

Referring to FIG. 3 and FIG. 4 together, the embodiments of the present disclosure provide a motor, which includes a stator device 100 and a rotor device 200.

The stator device 100 includes a core 20, a plurality of windings 30 and a plurality of slot wedge elements 10.

Wherein, the core 20 includes at least four core members 21 spaced apart in an axial direction X of the stator device 100, each core member 21 is provided with a plurality of slots 22 spaced apart in a circumferential direction, and the plurality of slots 22 of the at least four core members 21 are arranged to correspond one by one in the axial direction X. Each winding 30 is arranged in the slots 22 in the axial direction X. Specifically, in each slot 22, a pad strip 23 extending in the axial direction X is disposed, and each winding 30 is disposed in a space defined by the slots 22 and the pad strip 23 in the axial direction X.

Each slot wedge element 10 is disposed in the slots 22 in the axial direction X and is attached to the winding 30 via a first surface 11. Preferably, the slot wedge element 10 may be connected with portions on both sides of the slot 22 by means of joggle joints.

The stator device 100 is fixed by a stator bracket (not shown in the figure), and a radial channel W is formed between each adjacent two core members 21 in the stator device 100.

The rotor device 200 is disposed surrounding the stator device 100 on a peripheral side of the stator device 100, or the stator device 100 is disposed surrounding the rotor device 200 on a peripheral side of the rotor device 200. Chambers C are disposed on both ends of the motor in the axial direction, and an air gap A is formed between the rotor device 200 and the slot wedge elements 10, wherein the chambers C are communicated with the air gap A and the radial channels W to form a channel for flow of a cooling medium. Since there are more than three radial channels W, a flow process of the cooling medium in the radial channels W can be regarded as a flow process of the cooling medium in more than three parallel lines.

As mentioned above, in order to solve the problem of uneven temperature distribution in the axial direction in the stator of the motor in the prior art, a slot wedge element 10 may be constructed to change a cross-sectional area of the air gap A in the axial direction formed between the rotor device 200 and the slot wedge element 10, so as to adjust flow and static pressure distribution of a cooling air d flowing in the air gap A, and finally homogenize an axial distribution of the flows of the cooling air in the radial channels W, which are communicated with the air gap A.

Thus, the embodiments of the present disclosure provide a slot wedge element 10, which can be applied to the stator device 100 as shown in FIG. 3 and FIG. 4.

Figure 5:
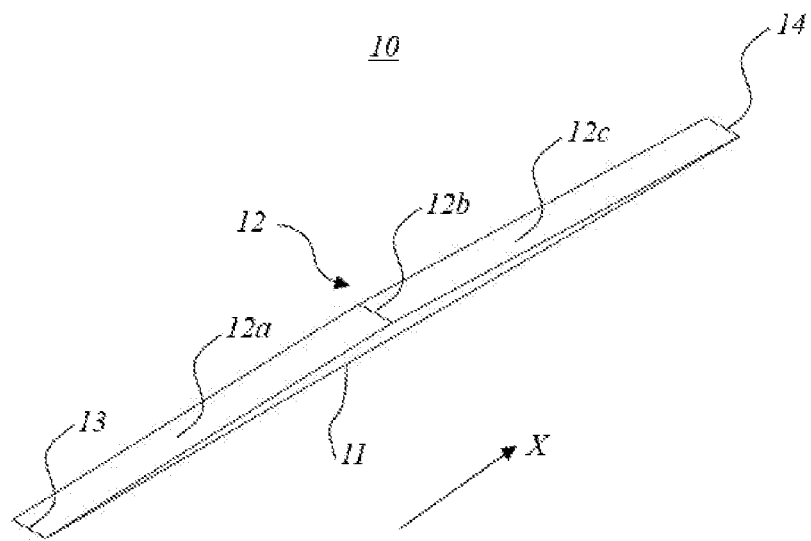
FIG. 5 is a structural schematic diagram of a slot wedge element of a first type provided in the embodiments of the present disclosure.

Referring to FIG. 5, the slot wedge element 10 extends in a first direction X and includes a first edge 13 and a second edge 14 opposite to each other. The slot wedge element 10 includes a first surface 11 and a second surface 12 in its thickness direction, and in the first direction X, the slot wedge element 10 is attached to the winding of the stator device via the first surface 11.

The second surface 12 includes a first portion 12a, a second portion 12b and a third portion 12c sequentially and continuously distributed in the first direction X. The first portion 12a is connected with the first edge 13, and the third portion 12c is connected with the second edge 14. Each of the first edge 13 and the second edge 14 may be a straight line or a plane surface with a certain thickness.

Wherein, a second thickness between the second portion 12b and the first surface 11 is greater than a first thickness between the first portion 12a and the first surface 11, the second thickness is greater than or equal to a third thickness between the third portion 12c and the first surface 11, and the first thickness decreases progressively in a direction from the second portion 12b to the first edge 13.

When the second thickness is greater than the third thickness, the third thickness decreases progressively in a direction from the second portion 12b to the second edge 14. A cross-sectional area of the flow in the axial direction X in the air gap A formed between the rotor device 200 and the slot wedge element 10, presents a change trend of gradually shrinking in the direction from the first edge 13 or the second edge 14 to the second portion 12b. In particular, when the first portion 12a and the third portion 12c are symmetrically arranged with respect to the second portion 12b, the change trend of the gradually shrinking is symmetrical from two axial end sides to a middle confluence point, as shown in FIG. 5.

When the second thickness is equal to the third thickness, the cross-sectional area of the flow in the axial direction X in the air gap A formed between the rotor device 200 and the slot wedge element 10 is equal on a side from the second portion 12b to the second edge 14, while decreases progressively in the direction from the second portion 12b to the first edge 13.

Figure 6:
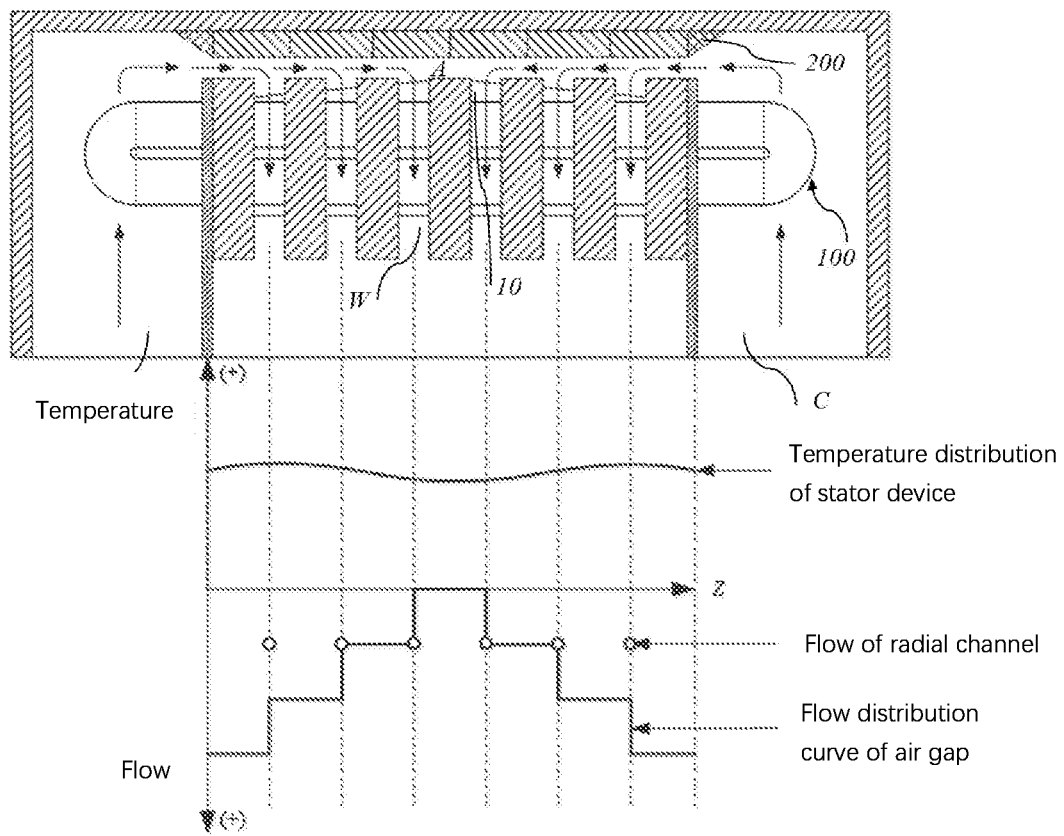
FIG. 6 is a flow distribution schematic diagram of a cooling medium in a motor provided in the embodiments of the present disclosure.
Figure 7:
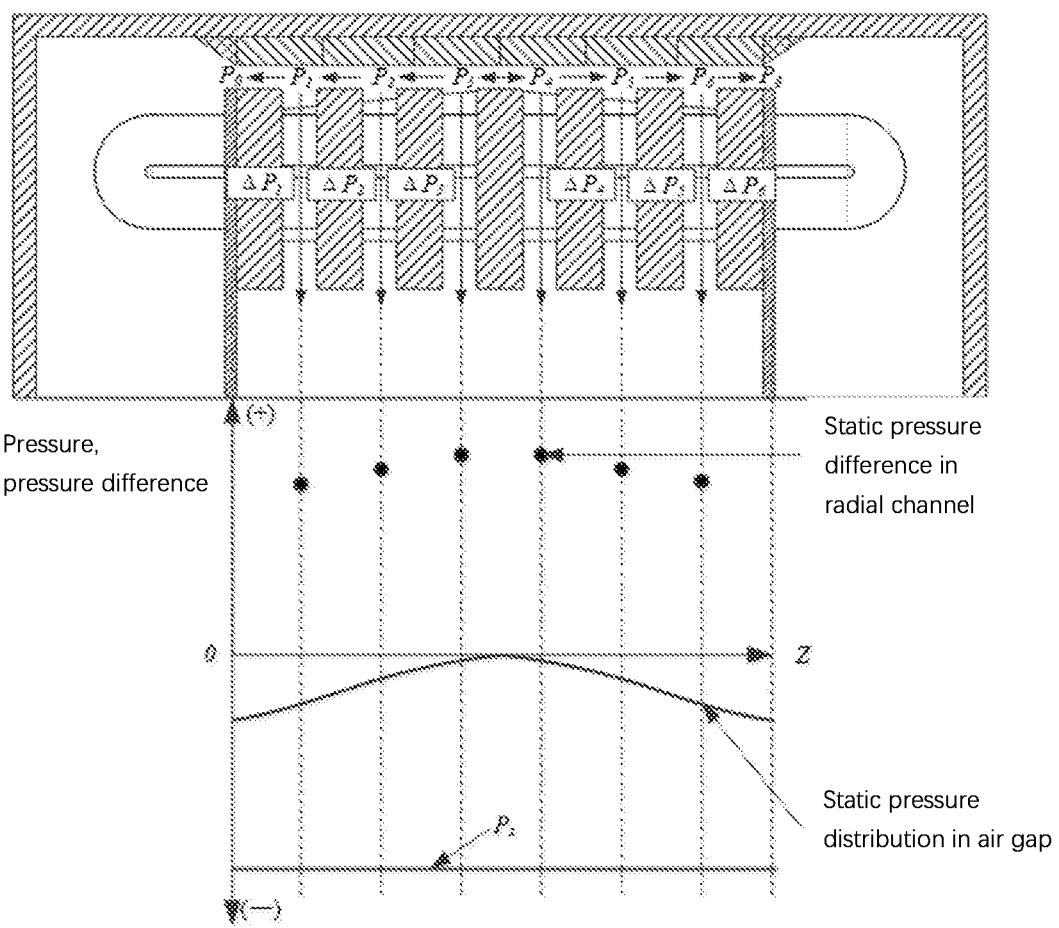
FIG. 7 is a static pressure distribution schematic diagram of a cooling medium in a motor provided in the embodiments of the present disclosure.

Please refer to FIG. 6 and FIG. 7 together. FIG. 6 and FIG. 7 respectively show a flow distribution diagram and a static pressure distribution diagram of the cooling medium in a motor according to the embodiments of the present disclosure adopting the slot wedge element 10 as shown in FIG. 5.

Although the flow of the cooling medium in the air gap A decreases gradually from the two axial end sides to the middle confluence point due to the dividing of the respective radial channels W, based on the structural form of the slot wedge element 10 as shown in FIG. 5, the cross-sectional area of the flow in the axial direction X in the air gap A formed between the rotor device 200 and the slot wedge element 10 decreases gradually, thereby mitigating the gradient of the flow velocity of the cooling medium in the air gap A from the two axial end sides to the middle confluence point. According to the principle of aerodynamics, the gradient of the static pressure, which is opposite to the gradient of the flow velocity in direction, is also mitigated. Compared with FIG. 2, the static pressure distribution in the axial direction X in the air gap A is more uniform, as shown in the static pressure distribution curve of the air gap A in FIG. 7. The homogenization of the static pressure level in the air gap A makes the static pressure levels at the respective inlets of radial channels W in the axial direction and the static pressure differences in the respective radial channels W to be closer to each other, as shown by the static pressure differences of the respective radial channels represented by the solid dots in FIG. 7, and finally making the flows of the cooling medium in the respective radial channels W distributed in the axial direction to be more uniform, as shown by the flows of the respective radial channels indicated by the hollow dots in FIG. 6. Finally, the stator device 100 with relatively uniform loss distribution may be cooled more evenly in the axial direction, as shown in the temperature distribution curve of the stator device in FIG. 6. Compared with the temperature distribution curve of the stator as shown in FIG. 1, the temperature difference of the stator device 100 in the axial direction X is relatively small, and thus the temperature distribution of the stator device 100 in the axial direction is relatively uniform, thereby eliminating the local overheating and excessive structural thenal stress that may occur in the operation of the motor.

By means of the slot wedge element 10 provided by the embodiments of the present disclosure, the cross-sectional area of the flow in the axial direction X in the air gap A formed between the rotor device 200 and the slot wedge element 10 gradually decreases at least from one of the first edge 13 and the second edge 14 to the second portion 12b, thereby affecting the flow and static pressure distribution of the cooling medium flowing in the air gap A and the radial channels W in a coordinated manner, which can reduce a local resistance to the flowing of the cooling medium at inlets of the air gap A, and make the flow distribution of the cooling medium in the radial channels W of the stator device 100 to be more uniform in the axial direction X, and thus improve the cooling effect on the generator.

The specific configuration of the slot wedge element 10 will be described in detail by combining with the accompanying drawings.

Figure 8:
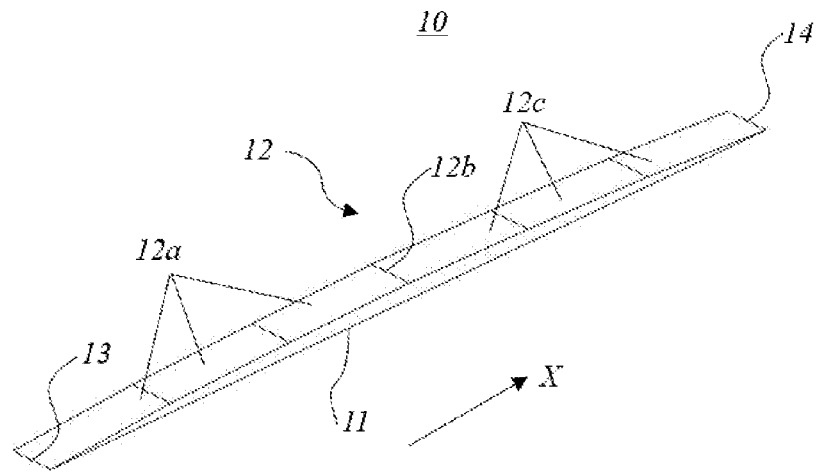
FIG. 8 is a structural schematic diagram of a slot wedge element of a second type provided in the embodiments of the present disclosure.
Figure 10:
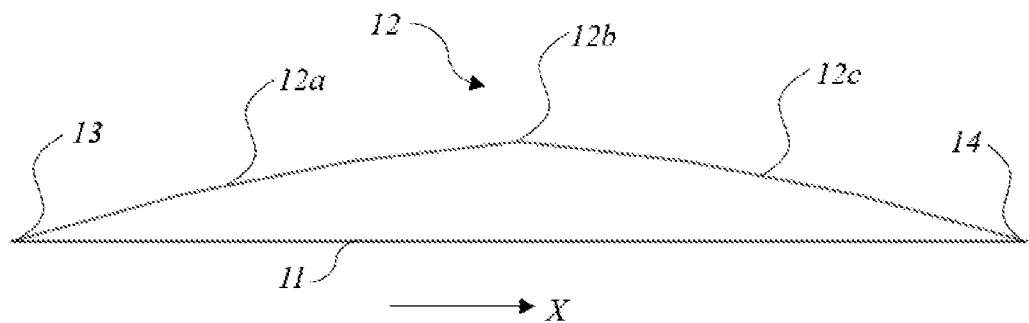
FIG. 10 is a structural schematic diagram of a slot wedge element of a fourth type provided in the embodiments of the present disclosure.

Referring to FIG. 5, FIG. 8 and FIG. 10 together, the first surface 11 of the slot wedge element 10 is a plane surface, and the second portion 12b is a dividing line formed between the first portion 12a and the third portion 12c. The dividing line may be a straight line, a broken line, a curved line, or the like. The embodiments of the present disclosure are described by taking the dividing line of a straight line as an example.

The first thickness decreases progressively in a gradient type in the direction from the second portion 12b to the first edge 13, and the third thickness decreases progressively in a gradient type in the direction from the second portion 12b to the second edge 14. The first portion 12a and the third portion 12c are each formed as an inclined surface, to adjust the cross-sectional area of the flow in the axial direction X in the air gap A, as shown in FIG. 5.

As an optional embodiment, the first portion 12a and the third portion 12c are each formed as two or more inclined surfaces which are continuously distributed, as shown in FIG. 8, which may mitigate the gradient of the cross-sectional area of the flow in the axial direction X in the air gap A, compared with the configuration of merely one inclined surface as shown in FIG. 5.

As an optional embodiment, the first portion 12a and the third portion 12c are each formed as one concave surface, as shown in FIG. 10, which may increase the gradient of the cross-sectional area of the flow in the axial direction X in the air gap A, compared with the configuration of the inclined surface as shown in FIG. 5.

As an optional embodiment, the first portion 12a and the third portion 12c are each formed as one convex surface, as shown in FIG. 10, which may mitigate the gradient of the cross-sectional area of the flow in the axial direction X in the air gap A, compared with the configuration of the inclined surface as shown in FIG. 5.

It should be noted that the first portion 12a and the third portion 12c may be arranged symmetrically with respect to the second portion 12b, as shown in FIG. 5, and FIG. 8 to FIG. 10. Further, the first portion 12a and the third portion 12c may be arranged asymmetrically with respect to the second portion 12b, for example, but not limited to, the first portion 12a is formed as one inclined surface or two or more inclined surfaces which are continuously distributed while the third portion 12c is formed as the convex surface or the concave surface, and other combination manners are also available; or, the first portion 12a and the third portion 12c have the same shape, but have different length dimensions in the axial direction X; or, the third portion 12c is formed as a plane surface parallel to the first surface 11 so that the third thickness of the slot wedge element 10 is equal to the second thickness, while the first thickness decreases progressively in the gradient type in the direction from the second portion 12b to the first edge 13.

Further, in the case that the flows of the cooling medium are equal at inlets of the air gap A on the two axial end sides, preferably, the slot wedge element 10 is configured such that the first portion 12a and the third portion 12c are arranged symmetrically with respect to the second portion 12b. In the case that the flows of the cooling medium are not equal at the inlets of the air gap A on the two axial end sides preferably, the slot wedge element 10 is configured such that the first portion 12a and the third portion 12c are arranged asymmetrically with respect to the second portion 12b, and that the second portion 12b is closer to the side of the air gap A with a smaller flow of the cooling medium.

Figure 9:
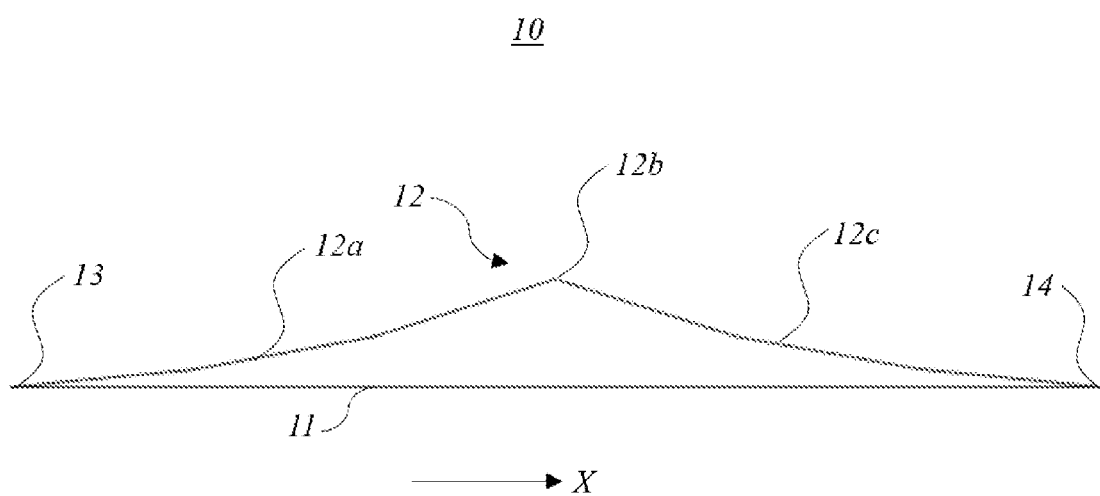
FIG. 9 is a structural schematic diagram of a slot wedge element of a third type provided in the embodiments of the present disclosure.

If after the stator device 100 adopts the slot wedge element 10 as shown in FIG. 5 or FIG. 8, in which the second portion 12b is formed as the dividing line, the flows of the cooling medium in the respective radial channels W still present a trend of being larger at the middle confluence point while being smaller on the two sides in the axial direction X, it is preferable to use the slot wedge element 10 with the convex surface as shown in FIG. 10; if the flows of the cooling medium in the respective radial channels W present a trend of being smaller at the middle confluence point while being larger on the two sides in the axial direction X, the slot wedge element 10 with the concave surface as shown in FIG. 9 may be used.

Figure 11:
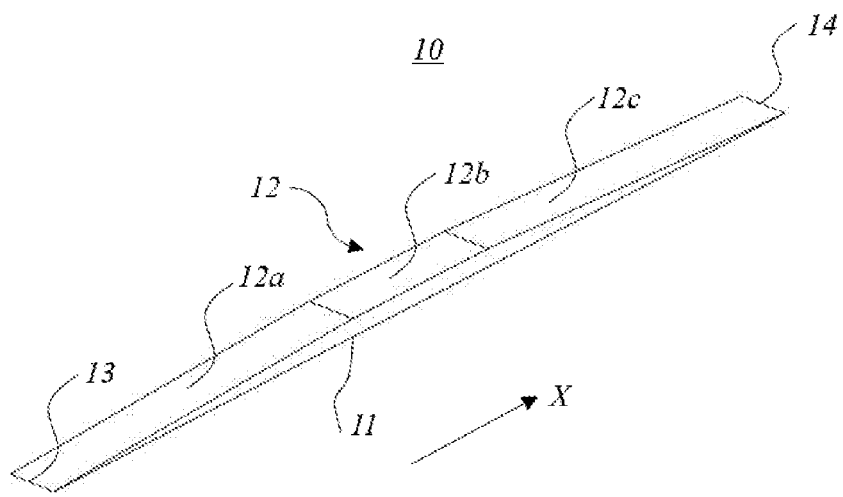
FIG. 11 is a structural schematic diagram of a slot wedge element of a fifth type provided in the embodiments of the present disclosure.

Referring to FIG. 11, the embodiments of the present disclosure further provides a slot wedge element 10, which has a similar configuration to the slot wedge element 10 as shown in FIG. 5, except that the second portion 12b is formed as a plane surface connecting the first portion 12a and the third portion 12c, and has a length dimension in the first direction X smaller than a length dimension in the first direction X of the first surface 11.

Preferably, the length dimension in the first direction X of the second portion 12b is smaller than the length dimensions in the first direction X of the first portion 12a and of the third portion 12c, so as to adjust the cross-sectional area of the flow in the axial direction X in the air gap A formed between the rotor device 200 and the slot wedge element 10 in a relatively wide range. Further, the first portion 12a and the third portion 12c may be symmetrically equal or unequal with respect to the second portion 12b.

It can be understood that the first portion 12a and the third portion 12c are each formed as one inclined surface, as shown in FIG. 11. Further, the first portion 12a and the third portion 12c each may be formed as any of the two or more inclined surfaces continuously distributed, one concave surface and one convex surface, and the first portion 12a and the third portion 12c may be arranged symmetrically with respect the second portion 12b (similar to the configuration of the slot wedge element 10 as shown in FIG. 5, FIG. 8 to FIG. 10), or may be arranged asymmetrically, specifically depending on whether the flows of the cooling medium at the inlets of the air gap A on the two end sides in the axial direction are equal, which will not be discussed in detail.

Therefore, if after the stator device 100 adopts the slot wedge element 10 in which the second portion 12b is formed as the plane surface as shown in FIG. 11, the flows of the cooling medium in the respective radial channels W still present a trend of being larger at the middle confluence point and being smaller in the two sides in the axial direction X, the length in the axial direction X of the plane surface of the second portion 12b may be lengthened, in addition to adopting the slot wedge element 10 which includes a second portion 12b of a plane surface and a convex surface; If the flows of cooling medium in the respective radial channels W present a trend of being smaller at the middle confluence point and being larger on the two sides in the axial direction X, the length in the axial direction X of the plane surface of the second portion 12b may be shortened, in addition to adopting the slot wedge element 10 which includes a second portion 12b of a plane surface and a concave surface.

Figure 12:
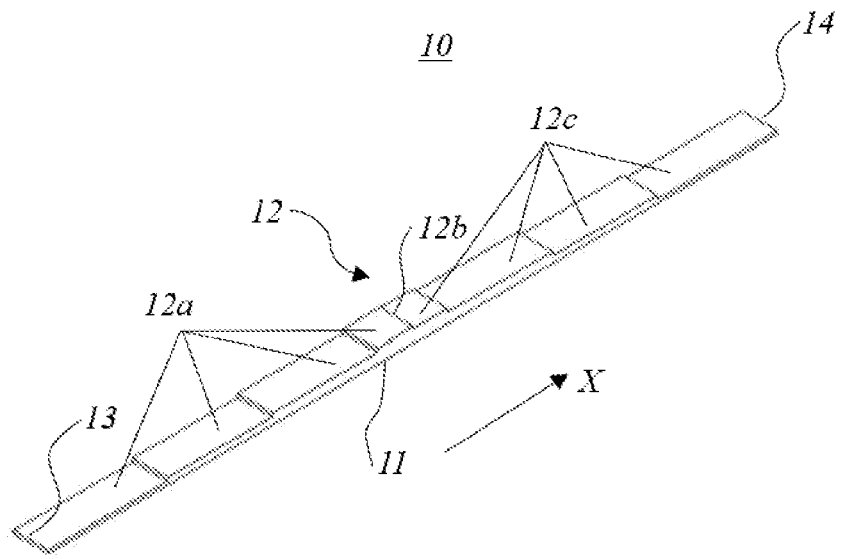
FIG. 12 is a structural schematic diagram of a slot wedge element of a sixth type provided in the embodiments of the present disclosure.
Figure 13:
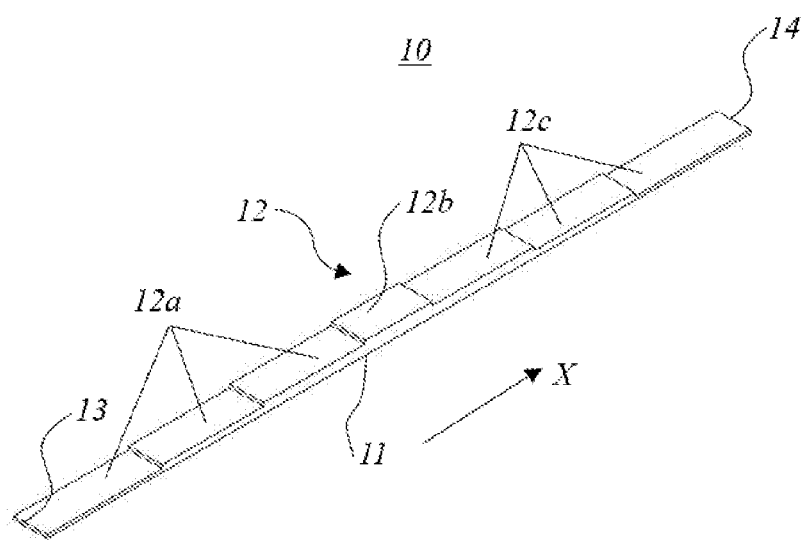
FIG. 13 is a structural schematic diagram of a slot wedge element of a seventh type provided in the embodiments of the present disclosure.

Referring to FIG. 12 and FIG. 13 together, the embodiments of the present disclosure further provide a slot wedge element 10, a configuration of which is similar to the configuration of the slot wedge element 10 as shown in FIG. 5 or FIG. 11, except that the first thickness decreases progressively in a step type in the direction from the second portion 12b to the first edge 13, the third thickness decreases progressively in a step manner in the direction from the second portion 12b to the second edge 14, and at least one of the first portion 12a and the third portion 12c includes one or more step surfaces, and preferably, height differences of respective adjacent two step surfaces are equal, so as to mitigate the gradient of the cross-sectional area of the flow in the axial direction X in the air gap A.

Specifically, as shown in FIG. 12, the second portion 12b may be a dividing line formed between the first portion 12a and the third portion 12c, and at least one of the first portion 12a and the third portion 12c includes one inclined surface close to the second portion 12b and one or more step surfaces connected with the inclined surface.

As shown in FIG. 13, the configuration of the slot wedge element 10 is similar to that of the slot wedge element 10 as shown in FIG. 12, except that the second portion 12b may be a plane surface connecting the first portion 12a and the third portion 12c, and the second portion 12b has a length dimension in the first direction X smaller than a length dimension in the first direction X of the first surface 11. At least one of the first portion 12a and the third portion 12c includes one or more step surfaces.

Preferably, the length dimension in the first direction X of the second portion 12b is smaller than the length dimensions in the first direction X of the first portion 12a and of the third portion 12c, so as to adjust the cross-sectional area of the flow in the axial direction X in the air gap A formed between the rotor device 200 and the slot wedge element 10 in a relatively wide range. However, the first portion 12a and the third portion 12c may be symmetrically equal or unequal with respect to the second portion 12b.

Further, if the stator device 100 adopts the slot wedge element 10 in which the second portion 12b is formed as the plane surface as shown in FIG. 13, the flows of the cooling medium in the respective radial channels W still present a trend of being larger at the middle confluence point and being smaller on the two sides in the axial direction X, the length of the plane surface of the second portion 12b in the axial direction X may be lengthened; if the flows of the cooling medium in the respective radial channels W present a trend of being smaller at the middle confluence point and being larger on the two sides in the axial direction X, then the length of the plane surface of the second portion 12b in the axial direction X may be shortened, or the slot wedge element 10 in which the second portion 12b is formed as the dividing line as shown in FIG. 12 may be used.

It should be noted that in the slot wedge element 10 as shown in FIG. 5, FIG. 8 to FIG. 13, there may be many combinations depending on whether the second portion 12b is formed as the dividing line or the plane surface, which may be specifically determined according to the actual applications and temperature test of the motor.

Therefore, the slot wedge element 10 provided by the embodiments of the present disclosure has a simple structure, and may be processed, manufactured and produced in a mass more easily, compared with some methods in the prior art for improving the radial ventilation cooling effect of the motor and making the flows of the cooling medium in the respective radial channels W more evenly distributed in the axial direction, for example, increasing the number of radial channels W, adjusting the core members 21 and/or the radial channels W so that the thicknesses of the radial channels in the axial direction are inconsistent.

Further, with the slot wedge element 10 provided in the embodiments of the present disclosure, the flow velocity of the cooling medium at the inlets on two end sides in the axial direction X of the air gap A formed between the slot wedge element 10 and the rotor device 200 of the motor can be reduced, thereby reducing a local resistance loss at the inlets of the air gap during the flowing of the cooling medium. The reduction of the resistance loss of the cooling medium can reduce an aerodynamic power of the motor required to maintain the same flow, so that a better cooling effect on the motor and meanwhile a higher power density of the motor may be achieved, which is helpful to increase the power and efficiency of the motor.

Further, the embodiments of the present disclosure provide a wind turbine, which includes a motor as described above. The motor according to the exemplary embodiments described above may also be applied to various devices that need a motor, not limited to the wind turbine.

The person skilled in the art should understand that, the above embodiments are exemplary and non-limitative. Different technical features appear in different embodiments may be combined to achieve beneficial effect. The person skilled in the art can understand and realize modified embodiments of the disclosed embodiments, based on the study on the drawings, description and the claims. In the claims, the term "comprise" does not exclude other means or steps; indefinite article "a" or "an" does not exclude multiple cases; and the terms "first", "second" are used to indicate names but not any specific order. Any reference numerals in the claims should not be understood as limiting on the protection scope. Functions of multiple parts in the claims may be achieved by an independent hardware module or software module. Some features appearing in different dependent claims does not mean that theses technical features cannot be combined to achieve beneficial effects.

The invention claimed is:

1. A slot wedge element applied for a stator device and extending in a first direction, comprising:

a first edge and a second edge opposite to each other; and
a first surface and a second surface in a thickness direction of the slot wedge element,
wherein the slot wedge element is attached to and directly resting on top of a winding of the stator device via the first surface;
wherein the second surface comprises a first portion, a second portion, and a third portion which are sequentially and continuously distributed in the first direction, the first portion is connected with the first edge, and the third portion is connected with the second edge; and
wherein a first thickness between the first portion and the first surface is smaller than a second thickness between the second portion and the first surface, the second thickness is greater than or equal to a third thickness between the third portion and the first surface, and the first thickness decreases progressively in a direction from the second portion to the first edge.

2. The slot wedge element according to claim 1, wherein the second thickness is greater than the third thickness, and the third thickness decreases progressively in a direction from the second portion to the second edge.

3. The slot wedge element according to claim 2, wherein the slot wedge element comprises either one of the following features:
   the first surface is formed as a plane surface, and the second portion is formed as a dividing line between the first portion and the third portion; and
   the second portion is formed as a plane surface connecting the first portion and the third portion, and the second portion has a length dimension in the first direction smaller than a length dimension of the first surface in the first direction.

4. The slot wedge element according to claim 3, wherein the first thickness decreases progressively in a gradient type in the direction from the second portion to the first edge.

5. The slot wedge element according to claim 4, wherein the first portion is formed as any of one inclined surface, two or more inclined surfaces continuously distributed, one concave surface and one convex surface.

6. The slot wedge element according to claim 3, wherein the third thickness decreases progressively in a gradient type in the direction from the second portion to the second edge.

7. The slot wedge element according to claim 6, wherein the third portion is formed as any of one inclined surface, two or more inclined surfaces continuously distributed, one concave surface and one convex surface.

8. The slot wedge element according to claim 3, wherein the first thickness decreases progressively in a step type in the direction from the second portion to the first edge.

9. The slot wedge element according to claim 8, wherein responsive to the second portion being formed as the dividing line, the first portion comprises one inclined surface close to the second portion and one or more step surfaces connected with the inclined surface; and responsive to the second portion being formed as the plane surface, the first portion comprises one or more step surfaces.

10. The slot wedge element according to claim 3, wherein the third thickness decreases progressively in a step type in the direction from the second portion to the second edge.

11. The slot wedge element according to claim 10, wherein responsive to the second portion being formed as the dividing line, the third portion comprises one inclined surface close to the second portion and one or more step surfaces connected with the inclined surface; and responsive to the second portion being formed as the plane surface, the third portion comprises one or more step surfaces.

12. The slot wedge element according to claim 2, wherein the first portion and the third portion are symmetrically arranged with respect to the second portion.

13. A stator device, comprising:
a core, comprising at least four core members spaced apart in an axial direction of the stator device, each of which is provided with a plurality of slots spaced apart in a circumferential direction, wherein the plurality of slots of the at least four core members are arranged to correspond one by one in the axial direction;
a plurality of windings, each of which is arranged in one of the plurality of slots in the axial direction; and
a plurality of slot wedge elements, each of which is arranged in one of the plurality of slots in the axial direction, each slot wedge element extending in a first direction and comprising:
   a first edge and a second edge opposite to each other; and
   a first surface and a second surface in a thickness direction of the slot wedge element,
   wherein the slot wedge element is attached to and directly resting on top of one of the plurality of windings of the stator device via the first surface;
   wherein the second surface comprises a first portion, a second portion, and a third portion which are sequentially and continuously distributed in the first direction, the first portion is connected with the first edge, and the third portion is connected with the second edge; and
   wherein a first thickness between the first portion and the first surface is smaller than a second thickness between the second portion and the first surface, the second thickness is greater than or equal to a third thickness between the third portion and the first surface, and the first thickness decreases progressively in a direction from the second portion to the first edge.

14. The stator device according to claim 13, wherein the second thickness is greater than the third thickness, and the third thickness decreases progressively in a direction from the second portion to the second edge.

15. The stator device according to claim 14, wherein the slot wedge element comprises either one of the following features:
   the first surface is formed as a plane surface, and the second portion is formed as a dividing line between the first portion and the third portion; and
   the second portion is formed as a plane surface connecting the first portion and the third portion, and the second portion has a length dimension in the first direction smaller than a length dimension of the first surface in the first direction.

16. The stator device according to claim 15, wherein the first thickness decreases progressively in a gradient type in the direction from the second portion to the first edge.

17. The stator device according to claim 16, wherein the first portion is formed as any of one inclined surface, two or more inclined surfaces continuously distributed, one concave surface and one convex surface.

18. The stator device according to claim 15, wherein the third thickness decreases progressively in a gradient type in the direction from the second portion to the second edge.

19. A motor, comprising:
a stator device, wherein the stator device is fixed by a stator bracket, and each adjacent two core members in the stator device define a radial channel; and a rotor device, disposed surrounding the stator device on a peripheral side of the stator device, or the stator device being disposed surrounding the rotor device on a peripheral side of the rotor device, wherein the motor comprises chambers on two ends in the axial direction, an air gap is formed between the rotor device and the slot wedge element, and the chambers, the air gap, and the radial channels are communicated to determine a channel for flow of a cooling medium, wherein the stator device comprises:

a core, comprising at least four core members spaced apart in an axial direction of the stator device, each of which is provided with a plurality of slots spaced apart in a circumferential direction, wherein the plurality of slots of the at least four core members are arranged to correspond one by one in the axial direction;

a plurality of windings, each of which is arranged in one of the plurality of slots in the axial direction; and a plurality of slot wedge elements, each of which is arranged in one of the plurality of slots in the axial direction, each slot wedge element extending in a first direction and comprising:

a first edge and a second edge opposite to each other; and a first surface and a second surface in a thickness direction of the slot wedge element, wherein the slot wedge element is attached to and directly resting on top of one of the plurality of windings of the stator device via the first surface;

wherein the second surface comprises a first portion, a second portion, and a third portion which are sequentially and continuously distributed in the first direction, the first portion is connected with the first edge, and the third portion is connected with the second edge; and wherein a first thickness between the first portion and the first surface is smaller than a second thickness between the second portion and the first surface, the second thickness is greater than or equal to a third thickness between the third portion and the first surface, and the first thickness decreases progressively in a direction from the second portion to the first edge.

20. The motor of claim 19, wherein the slot wedge element is constructed to change a cross-sectional area of the air gap formed between the rotor device and the slot wedge element, so as to adjust the flow and a static pressure distribution of the cooling medium flowing in the air gap.

* * * * *